US009514582B2

(12) United States Patent
Basir et al.

(10) Patent No.: US 9,514,582 B2
(45) Date of Patent: Dec. 6, 2016

(54) RECORDING AND REPORTING OF DRIVING CHARACTERISTICS

(75) Inventors: Otman Adam Basir, Waterloo (CA); David Bullock, Waterloo (CA)

(73) Assignee: Intelligent Mechatronic Systems Inc., Waterloo, Ontario (CA)

(*) Notice: Subject to any disclaimer, the term of this patent is extended or adjusted under 35 U.S.C. 154(b) by 1421 days.

(21) Appl. No.: 12/781,142

(22) Filed: May 17, 2010

(65) Prior Publication Data

US 2010/0223080 A1    Sep. 2, 2010

Related U.S. Application Data

(63) Continuation of application No. 11/045,584, filed on Jan. 28, 2005, now abandoned.

(60) Provisional application No. 60/540,165, filed on Jan. 29, 2004.

(51) Int. Cl.
*G06Q 40/00* (2012.01)
*G07C 5/08* (2006.01)
*G06Q 40/08* (2012.01)

(52) U.S. Cl.
CPC ............. *G07C 5/0883* (2013.01); *G06Q 40/08* (2013.01)

(58) Field of Classification Search
None
See application file for complete search history.

(56) References Cited

U.S. PATENT DOCUMENTS

| | | | |
|---|---|---|---|
| 4,970,496 A | 11/1990 | Kirkpatrick | |
| 5,442,553 A | 8/1995 | Parrillo | |
| 5,450,321 A | 9/1995 | Crane | |
| 5,550,738 A | 8/1996 | Bailey et al. | |
| 5,559,484 A | 9/1996 | Nowicki et al. | |
| 5,586,034 A | 12/1996 | Takaba et al. | |
| 5,586,130 A | 12/1996 | Doyle | |
| 5,742,915 A | 4/1998 | Stafford | |
| 5,797,134 A * | 8/1998 | McMillan et al. | 705/400 |
| 5,802,545 A | 9/1998 | Coverdill | |

(Continued)

FOREIGN PATENT DOCUMENTS

| | | |
|---|---|---|
| DE | 19812318 | 9/1999 |
| DE | 10029401 | 12/2001 |

(Continued)

OTHER PUBLICATIONS

T. Wenzel, Analysis of National Pay-As-You-Drive Insurance Systems and Other Variable Driving Charges, Lawrence Berkeley Laboratory, Jul. 1995, University of California.

(Continued)

*Primary Examiner* — Asha Puttaiah
(74) *Attorney, Agent, or Firm* — Carlson, Gaskey & Olds, P.C.

(57) ABSTRACT

A system for recording, transmitting and compiling information indicative of actual vehicle operation and usage includes a device installed within a vehicle. Sensors communicate with the device to provide information relating to operation of the vehicle. A location module utilizes satellite signals to determine the current location of a vehicle. A data extraction module sends data to a central process server. The central processor compiles and summarizes the information from the device for determination of vehicle usage for use in determining an insurance premium.

12 Claims, 3 Drawing Sheets

(56) References Cited

U.S. PATENT DOCUMENTS

| | | | |
|---|---|---|---|
| 6,040,763 A | 3/2000 | Nakajima | |
| 6,064,970 A | 5/2000 | McMillan et al. | |
| 6,076,026 A | 6/2000 | Jambhekar et al. | |
| 6,195,763 B1 | 2/2001 | Mayer et al. | |
| 6,232,886 B1 | 5/2001 | Morand | |
| 6,438,472 B1 * | 8/2002 | Tano et al. | 701/29.6 |
| 6,466,134 B1 | 10/2002 | Ahearn | |
| 6,868,386 B1 | 3/2005 | Henderson et al. | |
| 2002/0027502 A1 | 3/2002 | Mayor | |
| 2003/0055552 A1 | 3/2003 | Akins et al. | |
| 2004/0153362 A1 * | 8/2004 | Bauer et al. | 705/10 |

FOREIGN PATENT DOCUMENTS

| | | |
|---|---|---|
| DE | 10038793 | 1/2002 |
| EP | 1059508 | 12/2000 |
| EP | 1096430 | 5/2001 |
| EP | 1118965 | 7/2001 |
| FR | 2710170 | 3/1995 |
| GB | 2255665 | 11/1992 |
| JP | 2000-88680 | 3/2000 |
| WO | 96/10807 | 4/1996 |
| WO | 02/089084 | 11/2002 |
| WO | 03/069565 | 8/2003 |

OTHER PUBLICATIONS

International Search Report for PCT/CA2005/000116 mailed May 19, 2005.
International Search Report for PCT/CA2005/000117 mailed May 19, 2005.
Supplementary European Search Report for EP05706440 dated Sep. 9, 2009.
Supplementary European Search Report for EP05706441 dated Sep. 10, 2009.

* cited by examiner

RECORDING AND REPORTING OF DRIVING CHARACTERISTICS

This application is a continuation of U.S. application Ser. No. 11/045,584 filed on Jan. 28, 2005 now abandoned, which claims priority to U.S. Provisional Application No. 60/540,165 filed on Jan. 29, 2004.

BACKGROUND OF THE INVENTION

This invention relates to a device and method for recording driving characteristics. More particularly, this invention relates to a method and device for recording driving characteristics utilized to monitor and compile vehicle usage data for determining an insurance premium.

Vehicle insurance is currently determined substantially through the use of historical data combined with information from other sources concerning the vehicle owner and operator. The information concerning the operator typically includes general vehicle usage information such as how the operator typically uses the vehicle, such as for going back and forth to work. The places and locations in which the vehicle is utilized by the operator are also considered in the determination of the vehicle insurance premium.

A principal disadvantage with this method of insurance premium determination is that much of this information is not verifiable. In other words, an operator may exaggerate or under estimate the actual usage of the vehicle. Accordingly, an insurance provider is therefore at a disadvantage in applying a premium based on predicted or non-verifiable information. Some of these instances can be corrected through the periodic updating of information through available driving records such as available from state and local governments to reveal driving violations or accidents.

However, in the absence of such data the actual operating characteristics and use of a vehicle are not easily determinable. Accordingly, the insurance provider relies on the operator provided information.

Accordingly, it would be beneficial to develop a process and device for installation within a vehicle that could easily gather useful data that can be utilized for the determination of insurance premiums based on actual vehicle use.

SUMMARY OF THE INVENTION

This invention is a device for recording and transmitting information that is indicative of actual vehicle operation and usage.

The system of this invention includes a device installed within a vehicle. The device is installed in a location that is easily accessible to the vehicle operator to allow for easy access and retrieval of information gathered by the device. The device is in communication with other vehicle sensors disposed throughout the vehicle. Further, the device itself includes several sensors that provide information on vehicle operations.

The sensors communicating with the device include an accelerometer for determining the maximum acceleration and deceleration of the vehicle. Data from the accelerometer can be utilized to determine the specific driving habits of a vehicle operator. As appreciated, hard braking and hard acceleration are indicative of certain types of driving and can in some instance heighten risk factors that may cause an increase in insurance premiums.

The device also includes a location module that utilizes satellite signals to determine the current location of a vehicle. The current vehicle position can then be utilized to determine vehicle operation within a specific geographic limit. The geographic limit or location can be divided into postal codes, governmental subdivisions such as cities, towns or to the specific roadway on which the vehicle is operated.

The device also includes a motion sensor. The motion sensor provides a check to ensure the vehicle is in operation. In some instances, the device itself may not receive data due to an error in communication or in a faulty power supply from the vehicle power system. The motion sensor provides a means of detecting and indicating such instances.

The device includes a data extraction module for sending data to a central process server. The data extraction module can include a removable memory device, such as a removable USB memory stick or may simply be a plug in adapter for a USB or serial port connection utilized at a station. Further, the data extraction module may also comprise a wireless device for transmitting automatically information indicative of vehicle usage. This information is transmitted to a central processor for compiling. The central processor receives data from the device and formats and compiles that data into a usable format for determination of an applicable insurance premium.

Accordingly, the device and process of this invention provides an easy installable device for the acquisition of data that can be utilized to provide an accurate and verifiable summary of actual vehicle usage to improve the accuracy and determination of vehicle insurance premiums.

These and other features of the present invention can be best understood from the following specification and drawings, the following of which is a brief description.

DETAILED DESCRIPTION OF THE PREFERRED EMBODIMENT

Figure 1:
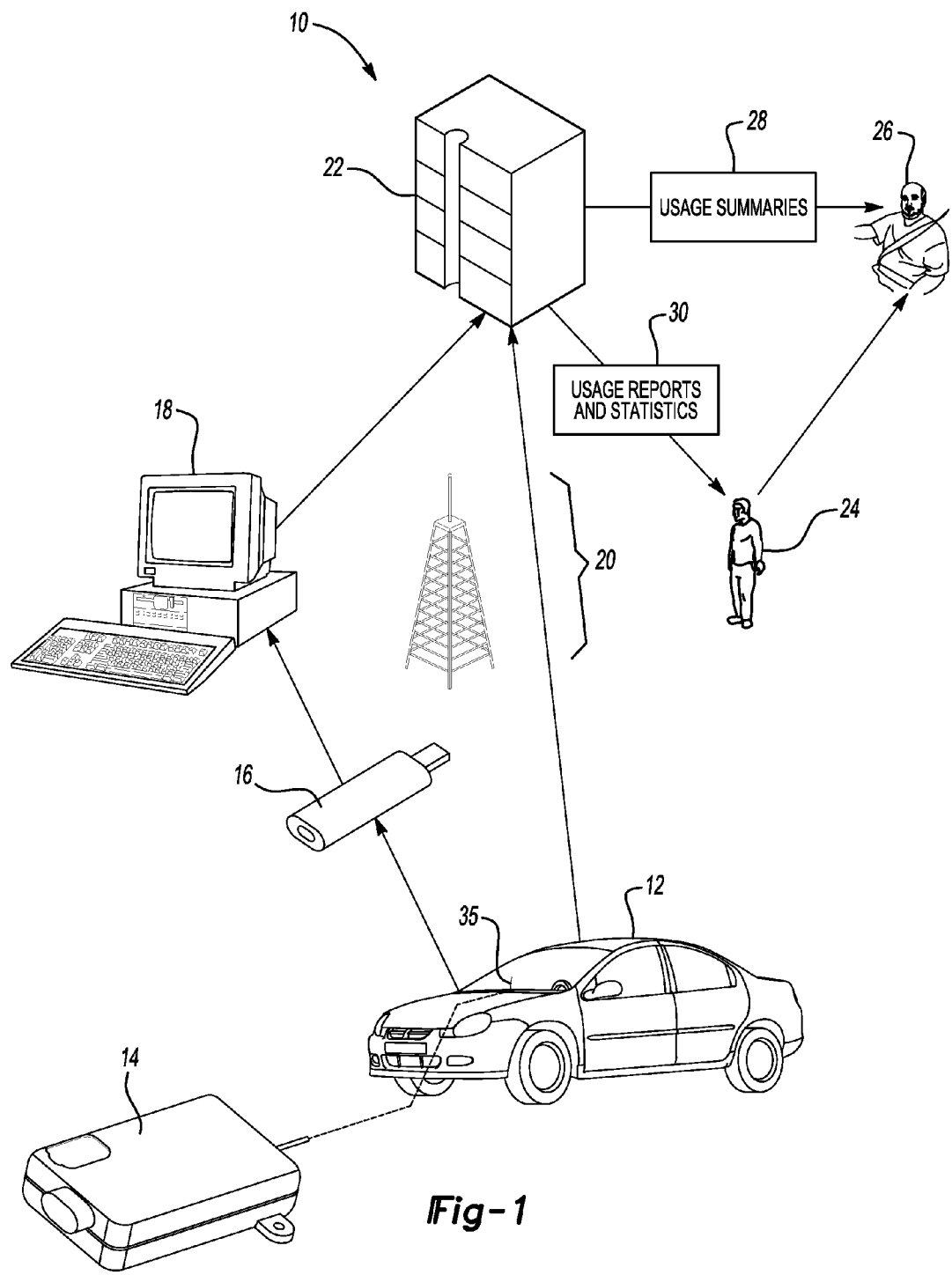
FIG. 1 is a schematic representation of an example system and process according to this invention for gathering vehicle usage data.

Referring to FIG. 1, a schematic representation of the system 10 is shown and includes a device 14 for installation within a vehicle 12. The device 14 is installed within the vehicle 12 preferably in a location that is easily accessible yet not in plain view such as to cause an obstruction to the operator. Preferably, the device 14 will be installed underneath an instrument panel or within a glove compartment. The device 14 is attached and connected to receive power from a vehicle power source. Power from the vehicle can originate from a fuse box or other powered connection within the vehicle 12 as known.

A memory device provides for the extraction of data gathered and stored within the device 14. The memory device illustrated is a USB data key 16 that is insertable and removable from the module 14. The USB data key 16 receives information that is compiled from the device 14 for subsequent analysis. In the example embodiment, the USB data key 16 is removed and communicates with a personal computer 18. The vehicle user removes the USB data key 16 in response to a triggering event such as a lapse of time and downloads the information into the personal computer 18. The information is then transmitted via the Internet or other data communication link to a central server 22. The central server 22 interprets the information and generates a summary 28 and usage reports 30.

The summary 28 may be reviewed by an operator 26 and insurance provider 24 and can contain any desired combination of information gathered by the device 14. The reports 30 for the insurance provider may include more directed and focused usage information directly focused for determining an insurance premium tailored to the specific operator 26.

FIG. 1 shows another example transmission method where the device 14 directly transmits by way of a wireless link 20 to the central server 22. This provides for the automatic transmission of data indicative of vehicle usage directly to the central server 22 without requiring operator intervention or action. Such a wireless transmission link streamlines data acquisition and processing at the central server 22. Further, automatic and direct transmission of vehicle usage information can substantially eliminate potential data integrity and verification issues that may arise with the involvement of the operator 26.

Figure 2:
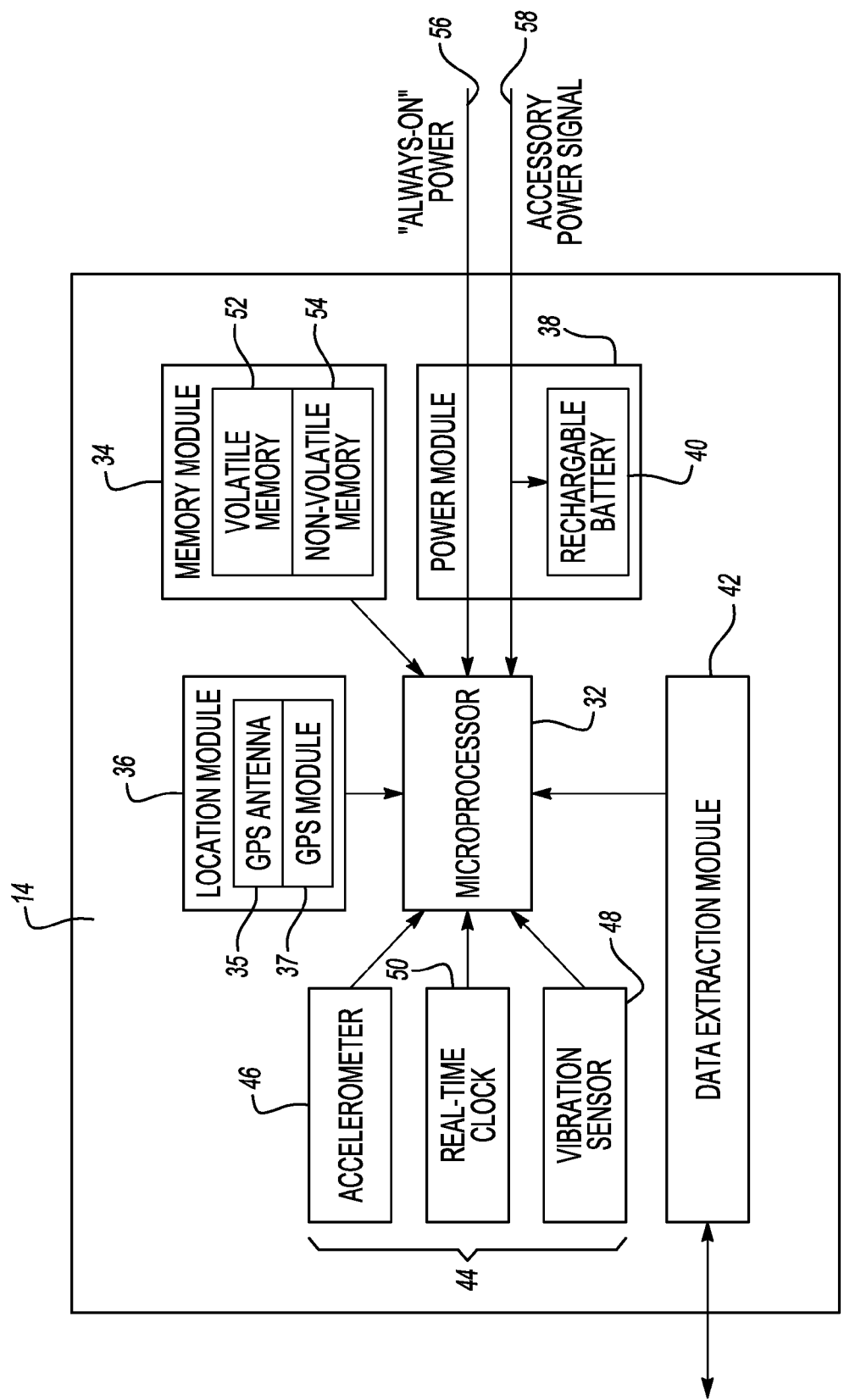
FIG. 2 is a block diagram of a device for gathering and compiling vehicle usage data according to this invention.

Referring to FIG. 2, the device 14 is shown schematically and includes a memory module 34, a power module 40, a location module 36 and a sensor module 44. Each of these modules is in communication with a microprocessor 32. The microprocessor 32 communicates with the various modules to receive data and other information as required.

The memory module 34 includes a volatile memory 52 and a non-volatile memory 54. Data is stored in the memory module 34 as directed by the microprocessor 32 until transmission to the central server 22.

The power module 40 is preferably connected to an always-on vehicle power source 56. Further, the power module includes a connection to an accessory power signal 58 that provides an indication that the vehicle ignition is on. The device 14 is powered by power from the vehicle 12. The power module 38 includes a rechargeable battery 40 for operation in circumstances where vehicle power is not provided to the device 14. This allows the device 14 to operate in some capacity when the vehicle power source is not properly providing power.

The power module 38 provides continuous main power from the vehicle's main battery source. In a preferred embodiment this power is accessed from a fuse panel or other vehicle power connection location. To ensure that during periods when power is disconnected, the rechargeable battery 40 is able to maintain system critical functionality. In other words, some power is always provided to the device 14 such that minimal functions can always be performed. As appreciated, although a rechargeable battery 40 is shown and described, standard non-rechargeable batteries are also within the contemplation for use in providing an alternate and independent power supply to the device 14.

The sensor module 44 includes an accelerometer 46 for determining an acceleration of deceleration of the vehicle 12. The accelerometer is preferably capable of measuring acceleration in three axes, however, any accelerometer known in the art is within the contemplation of this invention. Measuring acceleration provides a good indication of driving habits of the operator 26. Frequent hard braking and hard acceleration can be indicators of operator driving habits. Further, hard cornering is also detected by the accelerometer 46 and provides information indicative of an operator's driving habits.

A real time clock 50 provides the time for several purposes including providing a determination of the time of day in which the vehicle is operating. The clock 50 allows the determination of trends of vehicle usage. Further, the clock 50 is utilized to determined the amount of time the vehicle is used, per-day and over the enter data acquisition period.

The vibration sensor 48 provides an indication as to whether the vehicle is moving or not in the absence of power from the vehicle itself. This provides a validation function to determine if the lack of power from the vehicle is truly indicative of the vehicle not operating or if the vehicle is moving without powering the device 14.

The localization module 36 includes an antenna 35 and a global positioning system module 37. The antenna 35 receives signals from satellites to determine a location of the device 14, and thereby the vehicle with regard to a specific longitude and latitude. The position information provides for the determination of the places in which the vehicle is being utilized. Positional information provides for the determination of several valuable types of information including time within a specific geographic region in which a vehicle is operating. Further, the location module provides information that is utilized to determine how much time a vehicle is used within a specific defined region such as a postal code, city or town limit. Additionally, further, the system may even provide information as to the type of road the vehicle is used on, for example surface streets or on an expressway.

The device 14 includes a data extraction module 42 provides for the transmission and removal of data from the device 14. The data extraction module 42 can comprise a removable data storage device such as the USB key 16. The data extraction module 42 may also comprise a wireless transmission device for sending a transmission to a receiver station and subsequently to the central server 22. The wireless communication can include a wireless USB, an infrared signal or other known wireless transmission device. The data extraction module 42 may also includes a carrier based wireless transmission device. Further, the data extraction module 42 can include a peer-to-peer wireless transmission where an intermediate receiver station receives the peer-to-pear communication and passes it onto the central server 22 by a wireless or wired connection. The data extraction module 42 may also comprise a data modem transmission device that is attachable to a download station. The data extraction module 42 would comprise in such an embodiment a serial or other connection interface for attachment to a modem or other known connection or port.

The data extraction module 42 may also comprise a data display for an encoding an alphanumeric string. The alphanumeric string would be displayed on a digital display panel of a device. The encoded string could then be transmitted to the central server 22 through a number of methods including and not limited to the Internet, telephone or by mail. The data extraction module 42 would display an alpha numeric code utilized to determine if any events had occurred during the data-gathering period that would affect the insurance premium for the specific vehicle.

Once data has been extracted from the device 14 it may be viewable through the personal computer 18. The information once downloaded to the personal computer 18 could then be transmitted to the central server 22 where the data could be compiled for viewing and a determination of insurance premiums. Further, initial viewing of information on the personal computer 18 would afford a user an opportunity to review the data prior to submission to an insurance provider. The operator could then determine if the data is indicative of actual vehicle usage and if submission of the data would be beneficial to the user for reducing insurance premiums.

In the example embodiment, data is extracted from the device 14 and transmitted to the central server 22 by way of the USB key 16 and personal computer 18. Once the data is extracted and transmitted to the central server 22, this data can be consolidated into reports and summaries for the user and insurance provider.

Figure 3:
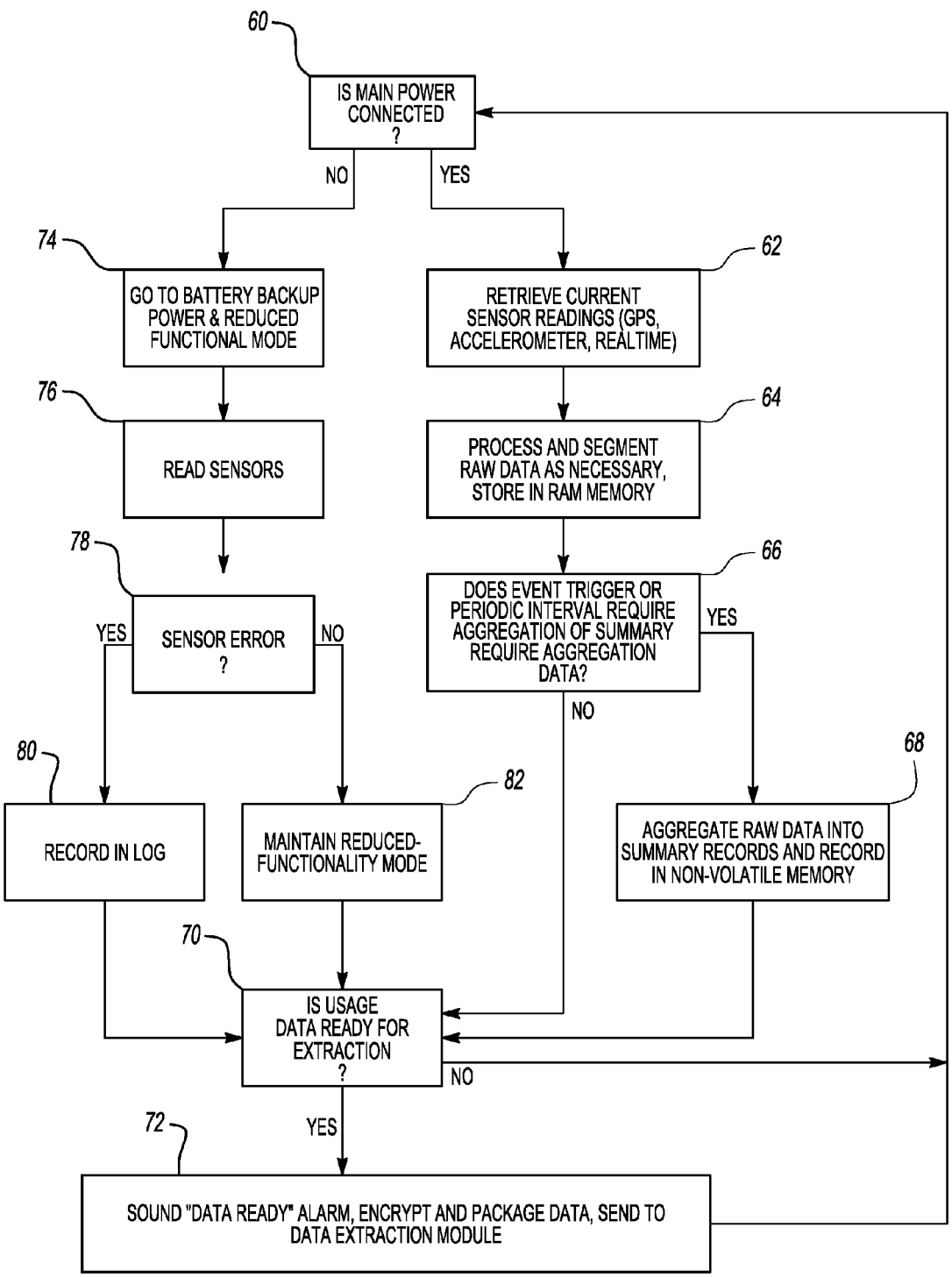
FIG. 3 is a flow diagram of process steps of a method according to this invention.

Referring to FIG. 3 a flow diagram illustrates the process of this invention utilizing the device for obtaining vehicle usage information. The process begins with the determination of whether or not the main power is on as indicated at 60. The indication that the main power is connected provides a means of determining whether the device 14 is operating properly. If the main power is connected and is indicated as being applied it can be determined that the vehicle is currently operating.

Once it has been determined that the vehicle 12 is currently operating the method and device 14 moves to determine if sensor readings are being received as indicated at 62. The sensor readings again includes the sensors that are built within and part of the device 14 including the accelerometer 46, the clock 50 and vibration sensor 48 along with the localization module 36.

During normal operation the localization module 36 provides vehicle position in longitude and latitude. The vehicle position is utilized to determine vehicle heading, speed and other information indicative of a vehicle position. Further, combination of the known longitude and latitude of the vehicle with geographic divisions such as postal codes, zip codes, governmental division such as cities or towns can be utilized to determine the amount of usage of a vehicle within a given area. As is appreciated insurance premiums are based in large part on the actual location and operation of the vehicle.

The use of the localization module 36 provides a means for gathering meaningful data on the position and operation location of a vehicle. The operational position of a vehicle can be correlated with geographic limits to determine a time in each of the divisions. As an example, a vehicle could be operated and it could be determined that a vehicle is operated for a certain percentage of the operating duration within a specific zip code. Further, with further correlation a combination with known geographic limits the vehicle operation with regard to use on an expressway or surface street is determined.

The geographic limits and segmentation are applied to the latitude and longitude data either at the central server 22 or in the device 14 itself. Depending on the detail desired for determination of the geographic limits, the application of postal code conversions are performed at the central server 22. In some instances, generalized and less detailed geographic applications can be performed by the device 14 to provide local processing of specifically desired geographic data.

As appreciated, it may not be practical to record a continuous stream of data from each sensor. However, extreme acceleration or deceleration can be recorded and provides a good indication of driver operating habits. In the preferred embodiment, a tri-axial accelerometer 46 is used to provide acceleration information along three axes. Although a tri-axial accelerometer is used it would be within the contemplation of this invention to use other types of accelerometers or multiple accelerometers to provide the desired information.

The clock provides a sensor operation that can indicate the specific times of day in which a driver 26 is operating the vehicle 12. Further, the specific time of day along with information indicative to the location of the vehicle 12 and acceleration and deceleration can indicate whether the vehicle 12 is being used during prime driving hours or if it is only being utilized during off times.

This information is cross-compared with information given by the operator 26 for verification purposes. The clock 50 can also be used to calculate driving time duration. This information is included in the actual data package to determine total driving time per day or total driving time within a specific geographic region. Periodically, the real time clock can use calibration information from the localization module 36 to adjust and correct the clock settings.

Other existing vehicle sensors can be connected to the device 14 to provide additional information. Such other sensors can include the use of the odometer, the fuel gauge or other currently or installed sensors in the vehicle 12 that can provide information that would be indicative of specific vehicle usages. The use of the odometer provides for the gathering of information or information on the actual miles that the vehicle is operating within the geographic location. This combined with the time within the geographic location and the positional information provided by the localization module 36 can be utilized together to provide a cross checking to ensure accuracy and integrity of the data. Further, the additional data can be utilized by itself to provide a wide range and format in combination of data that can be utilized as required or desired by an insurance provider.

As appreciated, data gathered by the plurality of sensors both within the device 14 and the vehicle 12 creates a large volume of data. This large volume of data is processed and segmented by the microprocessor 32 of the device 14 as indicated at 64. The raw data is segmented and stored within the memory module 34. This segmented raw data can be gathered for duration of time or can be selectively gathered to indicate certain triggering events according to desired criteria.

This data is stored within the memory module 34 and evaluated to determine if the triggering event has occurred that would initiate an extraction of data as is shown at 68. As appreciated, the specific duration of time or type of event that would trigger the download of information may be as directed by an application specific requirement. In some applications it may be desirable to trigger a download of information in response to a vehicle exceeding a certain speed. Still in other instances it may be desirable to trigger a download of information if a vehicle leaves a certain geographic zone. In other circumstances it may be desirable trigger data extraction after an elapsed period of time such as four months.

A buzzer, signal or other device that is mounted on the device 14 such as a light or audible device can trigger this download. Once it has been determined that a triggering event or a period of time has elapsed as shown at 70, data is extracted as indicated at 72 by any of the several methods described here and above. The triggering event can include the expiration of time, such as for example 4 months. The triggering event can also include exceeding a certain data capacity of the memory module. Still further, the triggering event can include exceeding a desired amount of actual miles driven. As appreciated, many different events can be selected to provide the trigger for extracting data to the central server 22.

One of the methods would include the use of a wireless transmission. The wireless transmission would automatically occur upon the occurrence of the triggering even or the elapse of the desired amount of time.

The data that is transmitted from the device 14 is not a stream of raw data for later processing. The device 14 complies the raw data and formulates a summary of that data for use by the insurer and the operator. As appreciated, simply downloading raw sensor data compiled through the entire operation of a vehicle would have little value. Accordingly, the device 14 of this invention breaks down and formulates this raw data into summary reports that include usable data. This usable data includes and is not limited to the time and duration a vehicle operates within a geographic area such as a certain zip code or a governmental division such as a city or town.

Further, the operation within a geographic location can be further segmented to determine vehicle operation along specific roadways or categories of roadways that is operation of the vehicle can be determined as an amount of time that a vehicle has been driven along a surface street or along expressways. Further, geographic location of the vehicle can also be utilized to determine the miles a vehicle has driven in a certain location or the amount of time a vehicle spends in a certain location.

If power is not connected as determined at 60 the device 14 initiates battery back up power as indicate at 74. In the battery back up power mode the device 14 operates with a reduced functions. The reduced functions include the operation of only limited sensors to determine if an error has occurred or if the power down condition is normal. The microprocessor 32 reads information for the operating sensors as is indicated at 76. Information and data from the operating sensors are analyzed according to a desired set of criteria as indicated at 78. If an error in operation is determined an entry is recorded in a log as indicated at 80. If sensor operation indicates no error, the device continues operation in reduced functionality mode as indicated at 82. This provides a means of detecting operational errors that may affect data integrity.

The device 14 and method of this invention provides a manageable, usable and simple method for obtaining vehicle usage information for use in determining and verifying vehicle operating conditions.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A device for gathering vehicle usage data for use in determining a vehicle insurance cost comprising:
   a memory module for storing data indicative of vehicle operating characteristics;
   a receiver for receiving satellite signals indicative of a vehicle position;
   a power module including a connection to an external power source, and an internal power source for powering said device independent of the external power source;
   a first sensor disposed within the device for detecting motion of said device;
   an accelerometer disposed within the device for detecting vehicle acceleration;
   a controller for governing the gathering of data stored within said memory module according to a desired detail level of vehicle operating characteristics, wherein the controller gathers data according to at least two selectable levels of detail including a first detail level that includes data indicative of vehicle operation and a second detail level includes data indicative of vehicle location, wherein the controller detects operation of the vehicle in the absence of power from the external power source with the first sensor to detect errors that may affect data integrity; and
   a data extraction module for forwarding data for use in determining a vehicle insurance cost, wherein the first sensor comprises a vibration sensor, and said controller actuates said vibration sensor responsive to a loss of external power.

2. The device as recited in claim 1, wherein the power module senses data indicative of vehicle ignition status for determining if the vehicle is operating in the absence of receiving data.

3. The device as recited in claim 1, wherein the first detail level comprises gathering data indicative only of vehicle operation outside desired vehicle operating parameters.

4. The device as recited in claim 1, wherein the first detail level comprises gathering data at desired time increments.

5. The device as recited in claim 1, wherein the second detail level comprises the gathering of data indicative of a percent of overall vehicle operating time within a defined geographic location.

6. The device as recited in claim 1, wherein the controller causes the recording of accelerations outside of a desired range in response to an absence of external power.

7. The device as recited in claim 1, wherein the controller causes the recording of data indicating operation of the vehicle responsive to data received from the first sensor in the absence of external power.

8. The device as recited in claiml 1, wherein the data extraction module includes a wireless link for transmitting vehicle usage information directly to the central server.

9. The device as recited in claim 1, wherein the data extraction module includes a removable data storage device.

10. The device as recited in claim 1, wherein the controller commands collection of data in response to a triggering event.

11. The device as recited in claim 10, wherein the triggering event comprises leaving a defined postal code.

12. The device as recited in claim 10, wherein the triggering event comprises exceeding a defined speed.

* * * * *

UNITED STATES PATENT AND TRADEMARK OFFICE
CERTIFICATE OF CORRECTION

PATENT NO. : 9,514,582 B2
APPLICATION NO. : 12/781142
DATED : December 6, 2016
INVENTOR(S) : Otman Adam Basir et al.

It is certified that error appears in the above-identified patent and that said Letters Patent is hereby corrected as shown below:

In the Claims

In Claim 8, Column 8, Line 45; replace "the" with --a-- before "central server"

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*